United States Patent
Davis et al.

(10) Patent No.: US 8,148,948 B2
(45) Date of Patent: Apr. 3, 2012

(54) ADAPTIVE LOW VOLTAGE DISCONNECT CONTROLLER, METHOD OF PROTECTING A BATTERY AND A POWER SYSTEM MANAGER

(75) Inventors: Roy J. Davis, Rowlett, TX (US); Darwin D. Smith, Rockwall, TX (US)

(73) Assignee: Lineage Power Corporation, Plano, TX (US)

( * ) Notice: Subject to any disclaimer, the term of this patent is extended or adjusted under 35 U.S.C. 154(b) by 436 days.

(21) Appl. No.: 12/404,180

(22) Filed: Mar. 13, 2009

(65) Prior Publication Data
US 2010/0231170 A1   Sep. 16, 2010

(51) Int. Cl.
*H02J 7/00* (2006.01)

(52) U.S. Cl. .......................................... 320/136
(58) Field of Classification Search .......... 320/136, 320/128
See application file for complete search history.

(56) References Cited

U.S. PATENT DOCUMENTS

| | | | | |
|---|---|---|---|---|
| 5,969,503 A * | 10/1999 | Davis et al. | .................... | 320/120 |
| 6,242,873 B1 * | 6/2001 | Drozdz et al. | ................ | 318/139 |
| 6,304,059 B1 * | 10/2001 | Chalasani et al. | ............ | 320/118 |
| 6,502,044 B1 * | 12/2002 | Lane et al. | ...................... | 702/63 |
| 6,532,425 B1 * | 3/2003 | Boost et al. | ..................... | 702/63 |

* cited by examiner

*Primary Examiner* — M'Baye Diao

(57) ABSTRACT

Provided herein is a controller for a low voltage disconnect (LVD), a method of protecting and providing a maximum or substantially maximum battery reserve coupled to a DC load bus and a power system manager. In one embodiment, the LVD controller includes an adaptive disconnect system configured to determine a variable LVD threshold voltage value and instruct the LVD to disconnect a battery reserve from a DC load bus based thereon. The variable LVD threshold voltage is determined based on a current of the battery reserve during a battery-discharge event.

20 Claims, 3 Drawing Sheets

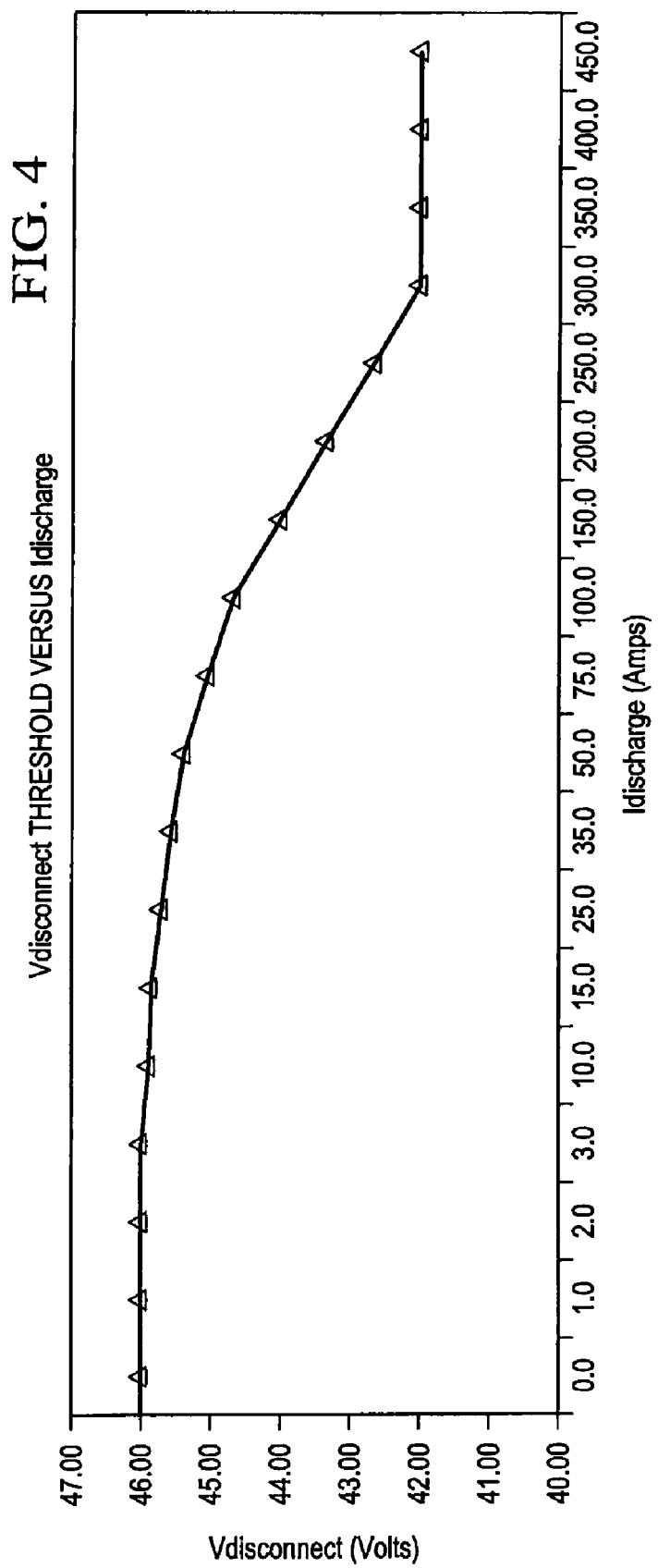

ADAPTIVE LOW VOLTAGE DISCONNECT CONTROLLER, METHOD OF PROTECTING A BATTERY AND A POWER SYSTEM MANAGER

TECHNICAL FIELD OF THE INVENTION

The invention is directed, in general, to battery reserves and, more specifically, to protecting battery reserves in power systems while providing a maximum or substantially maximum backup.

BACKGROUND OF THE INVENTION

There are many systems that have a backup supply in the form of batteries, generators or other UPS sources. Some power systems, for example, include rectifiers that receive and rectify AC power to produce DC power on a bus for powering external equipment (i.e., loads). When the AC source is unable to provide power, power systems can utilize batteries as back-up to provide DC power on the bus. In some systems, the battery reserve can be highly undersized and subjected to a very high rate of discharge for a short period of time. To prevent damage to the batteries or shortening their useful life, batteries are actively disconnected from the DC bus. Not only does this help the batteries it prevents damage to cables and other system components.

Traditional low voltage disconnect (LVD) schemes in the Telecom industry utilize a pure voltage disconnect threshold or a combination of a voltage or elapsed time disconnect threshold. These traditional methods of disconnect, however, are not optimum for Very High Rate (VHR) discharge applications. In VHR discharge applications, the discharge times are generally less than a minute with a 10-15 second reserve design time being very common. Traditional disconnects are not optimum because these disconnects are for systems designed for longer reserve times that can range from one-to-eight hours or more. The algorithms associated with traditional disconnects are tailored for battery reserve systems designed for sustained deep discharges. Thus, battery life and system reserve time can be at stake when using traditional LVD schemes with VHR discharge applications.

SUMMARY OF THE INVENTION

To address the above-discussed deficiencies of the prior art, the invention provides in one aspect a controller for a low voltage disconnect (LVD). In one embodiment, the LVD controller includes an adaptive disconnect system configured to determine a variable LVD threshold voltage value and instruct the LVD to disconnect a battery reserve from a DC load bus based thereon. The variable LVD threshold voltage is determined based on a current of the battery reserve during a battery-discharge event.

BRIEF DESCRIPTION OF THE DRAWINGS

For a more complete understanding of the invention, reference is now made to the following descriptions taken in conjunction with the accompanying drawings, in which:

FIG. 4 illustrates Graph 1, which is a plot from Table 1 of LVD Disconnect Threshold Voltage versus Battery Discharge Current.

DETAILED DESCRIPTION

Instead of relying solely on pre-determined and configured disconnect thresholds, various embodiments are disclosed that determine the optimum disconnect threshold for a LVD by utilizing a real-time algorithm that adapts to the actual load of a battery reserve during discharge. The disclosed embodiments can allow a customer to reduce the size of a battery reserve, reduce the size of reserve interconnections, improve reserve times for system equipment and optimize disconnect values for battery life expectancy.

The embodiments herein disclose battery controllers capable of controlling a LVD using an adaptive voltage threshold. The battery controllers can use the adaptive mode in addition to the traditional control modes voltage based or time based modes of control.

The adaptive control mode utilizes a linear equation to determine the LVD threshold voltage. The linear equation relates the LVD voltage ($V_{Disconnect}$) to the load on the battery reserve ($I_{battery}$) during a battery discharge event for a specific assigned LVD. The actual voltage compared to the LVD threshold voltage is the DC bus voltage that can be measured directly by the LVD controller using conventional means.

Figure 1:
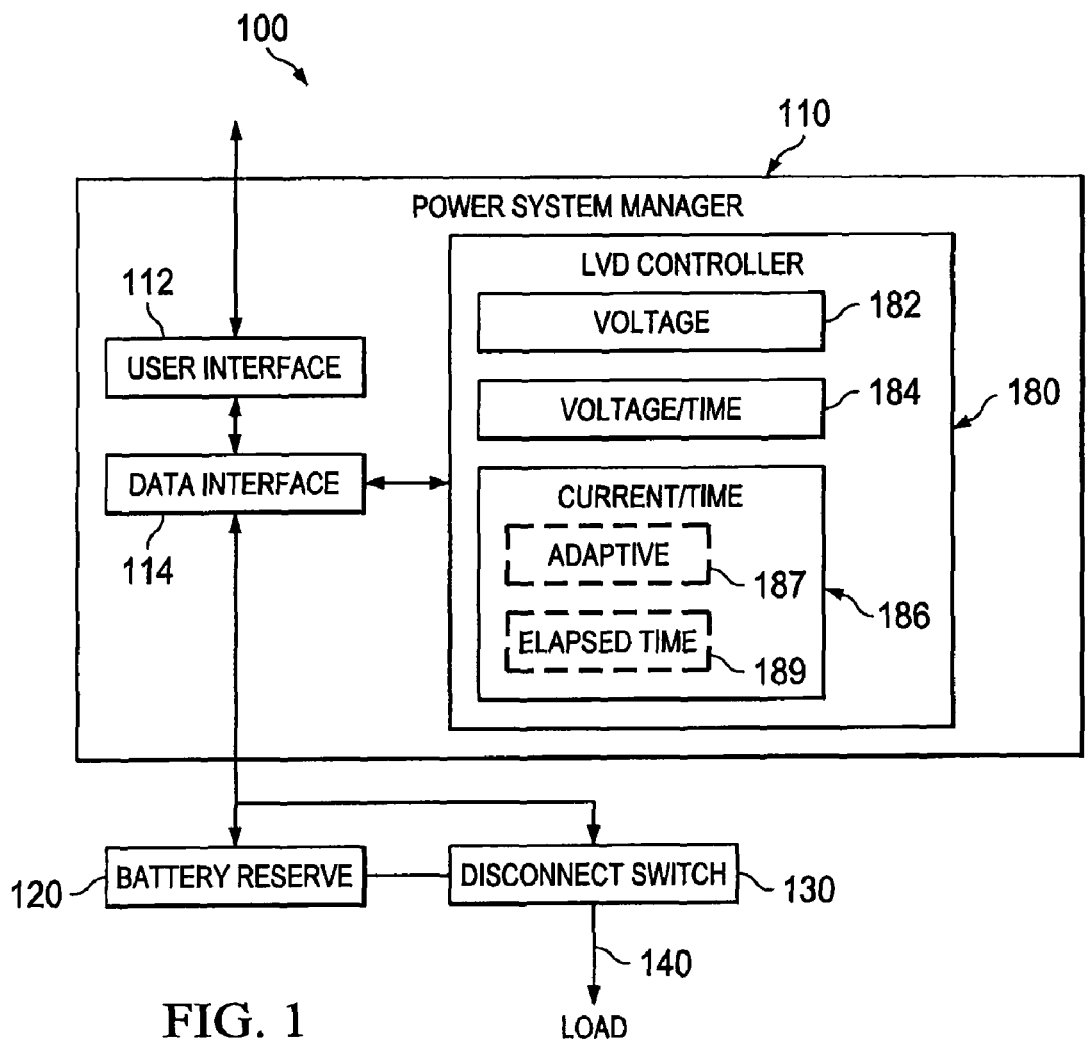
FIG. 1 illustrates a block diagram of an embodiment of a power system manager, constructed according to the principles of the present invention, employed in a power system providing power to a load.

FIG. 1 illustrates a block diagram of an embodiment of a power system manager 110 employed in a power system 100 coupled to a load. In addition to the power system manager 110, the power system 100 includes a battery reserve 120, a disconnect switch 130 and a DC bus 140. The battery reserve 120, the disconnect switch 130 and the DC bus 140 may all be conventional devices found in typical power systems. Additionally, one skilled in the art will understand that the battery reserve 120, the disconnect switch 130 and the DC bus 140 may represent multiple devices. For example, the battery reserve 120 may contain multiple batteries connected to the DC bus 140 via multiple disconnect switches.

The power system manager 110 includes a user interface 112, a data interface 114 and a LVD controller 116. The power system manager 110 may also include additional controllers, interfaces, monitors, etc., that are included in a conventional power system controller.

The power system manager 110 may be implemented at least in part as a digital data processor that is programmed or stores executable programs of sequences of software instructions to perform one or more of the described functions. The software instructions of such programs may be encoded in machine-executable form on conventional digital data storage media, e.g., magnetic or optical disks, random-access memory (RAM), magnetic hard disks, flash memories, and/or read-only memory (ROM), to enable various types of digital data processors or computers to perform one, multiple or all of the above described functions.

The user interface 112 is configured to allow the exchange of information between a user and the power system manager 110. The user interface 112 may include a display and control pad for user input. In some embodiments, the user interface 112 may include a keypad. The display may be a conventional liquid crystal display (LCD).

The data interface 114 is configured to allow receipt and transmission of information. The data interface 114 may include multiple ports for receiving and transmitting monitor and control inputs. The data interface 114 may include conventional ports that are typically used to allow the transfer of data. The data interface 114 includes at least one port coupled to the disconnect switch 130 of the power system 100 to allow the transmission of control signals therebetween. Additionally, the data interface 114 includes at least one port that receives current measurements of the battery reserve 120.

The LVD controller 116, coupled to the user interface 112 and the data interface 114, is configured to control the operation of the disconnect switch 130 (or disconnect switches) that connects the battery reserve 120 to the load. As illustrated, the battery reserve 120 is typically coupled to the load via the DC bus 140. As such, the LVD controller 116 generates control signals to open and close the disconnect switch 130 to disconnect or connect the battery reserve 120 to the DC bus 140.

The LVD controller 116 may include multiple systems representing modes of operation for controlling the disconnect switch. For example, the LVD controller 116 may control the disconnect switch 130 employing conventional voltage and voltage/time modes of operation represented by Voltage 182 and Voltage/Time 184 systems in FIG. 1. Additionally, the LVD controller 116 includes an adaptive disconnect system 187 that controls the disconnect switch 130 employing a variable threshold voltage. The adaptive disconnect system 187 may be part of a current/time mode of operation, Current/Time 186, that also includes an elapsed time disconnect system 189. An elapsed time disconnect system will be discussed in more detail with respect to FIG. 2. Each of these systems represent a mode of operation for controlling the disconnect switch 130.

The adaptive disconnect system 187 is configured to disconnect the battery reserve 120 from the DC load bus 140 based on a variable LVD threshold voltage. The adaptive disconnect system 187 is configured to determine the variable LVD threshold voltage from a load on the battery reserve 120 during a battery-on-discharge event.

In one embodiment of the adaptive disconnect system 187, a maximum and a minimum LVD threshold voltage value are user-defined according to user-defined minimum and maximum current values for the battery reserve 120 during a battery-discharge event. The adaptive disconnect system 187 dynamically calculates the variable LVD threshold voltage value when the discharge current of the battery reserve 120 is between the user-defined maximum and minimum current values.

The adaptive disconnect system 187 may employ a fixed value for the variable LVD threshold voltage value when the current is greater than the maximum user-defined current value and less than the minimum user-defined current value. In some embodiments, the variable LVD threshold voltage value is the maximum LVD threshold voltage when the current is less than the minimum user-defined current value. Additionally, the variable LVD threshold voltage value may be the minimum LVD threshold voltage when the current is greater than the maximum user-defined current value.

Figure 2:
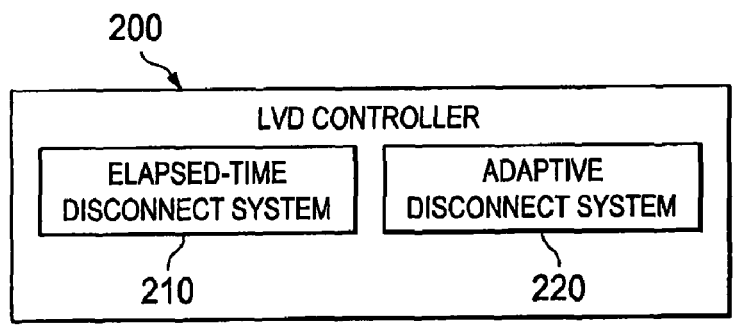
FIG. 2 illustrates a block diagram of an embodiment of a LVD controller constructed according to the principles of the present invention.

FIG. 2 illustrates a block diagram of an embodiment of a LVD controller 200. The LVD controller 200 is configured to direct the operation of a LVD. The LVD controller 200 may be implemented as a processor with a computer readable medium having stored thereon a series of operating instructions that direct the operation of the processor. The LVD controller 200 may be part of an overall power system manager such as the power system manager 110 of FIG. 1.

The LVD controller 200 includes an elapsed-time disconnect system 210 and an adaptive disconnect system 220. The LVD controller 200 may include additional components or systems that are typically found in conventional LVD controller. For example, interfaces and additional modes of operation, such as a voltage mode or a time mode, may be included in the LVD controller 200.

The elapsed-time disconnect system 210 is configured to instruct the LVD to disconnect a battery reserve from a DC load bus based on a designated amount of time. The elapsed-time disconnect system 210 may operate as a time delay feature included in a voltage/time operation mode of a conventional disconnect controller. It is the amount of time delay used once the LVD controller 200 has determined a power system has an AC failure (or multiple AC failures) and a battery discharge before it disconnects the respective contactor (i.e., disconnect switch).

The adaptive disconnect system 220 is configured to determine a variable LVD threshold voltage value and employ the interface to instruct the LVD to disconnect a battery reserve from a DC load bus based thereon. The variable LVD threshold voltage is determined based on a current of the battery reserve during a battery-discharge event. The battery reserve current can be measured by a conventional ammeter and transmitted to the LVD controller 200 via the interface 210. In one embodiment, the LVD controller 200 may employ a variable LVD threshold voltage upon determining a system state to be "Battery On Discharge," (battery reserve is discharging) and the LVD control mode is "Adaptive."

In one embodiment, the LVD controller 200 may employ the following point-slope linear equation to determine the LVD threshold voltage from the measured battery load current:

$$V_{disconnect} = (I_{battery} - b)/m \qquad \text{(Equation 1)}$$

where "m" is the slope of the line defined by two user configurable voltage and current endpoints, ($V_{LVDmin}$, $I_{batmax}$) and ($V_{LVDmax}$, $I_{batmin}$). These two required points are used to define a variable disconnect voltage threshold for a measured battery current. $V_{LVDmin}$ is the minimum LVD threshold voltage desired at the high battery current entered and $V_{LVDmax}$ is the maximum LVD threshold voltage desired at the low battery current entered. $V_{LVDmax}$ must be greater than $V_{LVDmin}$ and $I_{batmax}$ must be greater than $I_{batmin}$.

The LVD controller 200 may implement configuration ranges for the end-points based on such factors as the battery type and power system installation. For example, considering a battery reserve of VRLA batteries, the following ranges may be used:

| | | |
|---|---|---|
| $V_{LVDmax}$ and $V_{LVDmin}$ | Range = | 39.00 to 50.00 Volts |
| $I_{batmin}$ and $I_{batmax}$ | Range = | 0 to 9999 Amps. |

The value of "m" may be determined by the following equation:

$$m = (I_{batmin} - I_{batmax})/(V_{LVDmax} - V_{LVDmin}) \qquad \text{(Equation 2)}$$

where "b" is the standard Y-intercept which is the value of current where the curve crosses the current (Y) axis. The value of "b" may be determined by one of the following equations:

$$b = I_{batmin} m * V_{LVDmax} \qquad \text{(Equation 3A)}$$

or $$b = I_{batmax} - m * V_{LVDmin}. \qquad \text{(Equation 3B)}$$

Equations (1) through (3A-3B) along with the ranges for the user configurable end-points, define the transfer between $I_{battery}$ and $V_{disconnect}$. By definition, the value of ($I_{batmin}-I_{batmax}$) is less than zero (negative) and ($V_{LVDmax}-V_{LVDmin}$) is greater than zero (positive). This also implies the slope "m" is negative and not equal to zero. If these conditions are not met by the values for the user end-points, the LVD controller 200 can utilize a time-based delay, such as the elapsed time disconnect system 210, to disconnect the LVD. If the LVD controller 200 does not employ a time-base delay, a standard LVD disconnect threshold based on a "Voltage" or "Voltage/Time" operating control mode can be utilized. In some embodiments, the pre-determined disconnect voltage may be set at or about 42V.

The values of ($V_{LVDmin}$, $I_{batmax}$) and ($V_{LVDmax}$, $I_{batmin}$) define the maximum and minimum LVD threshold voltage. The LVD controller 200 dynamically calculates the voltage disconnect threshold values between the two end-points for currents within the entered current ranges. For currents equal to or outside of the end-point values the voltage disconnect threshold values can be fixed. For example, values of current measured greater than or equal to $I_{batmax}$ will utilize an LVD threshold voltage equal to the lowest system LVD threshold voltage, $V_{LVDmin}$. Additionally, values of current less than or equal to $I_{batmin}$ will utilize an LVD threshold voltage equal to the highest system LVD threshold voltage, $V_{LVDmax}$. Thus, $$V_{disconnect}=V_{LVDmin} \text{ for } I_{battery} \geq I_{batmax}$$

$$V_{disconnect}=V_{LVDmax} \text{ for } I_{battery} \leq I_{batmin}.$$

By employing this technique, the LVD controller 200 can be configured by a user to use the industry standard end-voltages that differ with load. For example, assuming a 100AH battery using standard End of Voltages (EOVs) and discharge rates of 1C and 1.5C, some VRLA batteries want 1.75V EOV (42V) disconnects at medium to high currents and 1.65V (40V) EOV for higher currents. Accordingly, default values for the LVD controller 200 can be set as:

$$(V_{LVDmin}, I_{batmax})=(40.0V, 150 \text{ A})$$

$$(V_{LVDmax}, I_{batmin})=(42.00V, 100 \text{ A})$$

Considering the following values as an example, the LVD controller 200 may operate as described below. The values may be defined by a HR22-12 battery as follows:

$$V_{LVDmin}, I_{batmax})=(42.0V, 300 \text{ A})$$

$$V_{LVDmax}, I_{batmin})=(46.00V, 3 \text{ A})$$

The LVD controller 200 can determine the following values:

$$(V_{LVDmin}, I_{batmax})=(42.0V, 300 \text{ A}) \text{ and } (V_{LVDmax}, I_{batmin})=(46.00V, 3 \text{ A}),$$

$$m=(I_{batmin}-I_{batmax})/(V_{LVDmax}-V_{LVDmin})=(3-300)/(46-42)=-297/4, \text{ and}$$

$$b=I_{batmax}-m*V_{LVDmin}=300-[(-297/4)*42]=3418.5.$$

Thus, plotting the following sample points with the equation $V_{disconnect}=-4*(I_{battery}-3418.5)/297$ and applying the end-point boundary criteria yields the plot of Table 1 in Graph 1, as illustrated in FIG. 4.

TABLE 1

LVD Disconnect Threshold Voltage versus Battery Discharge Current

| Vdisconnect | Idischarge |
|---|---|
| 46.00 | 0.0 |
| 46.00 | 1.0 |
| 46.00 | 2.0 |
| 46.00 | 3.0 |
| 45.91 | 10.0 |
| 45.84 | 15.0 |
| 45.70 | 25.0 |
| 45.57 | 35.0 |
| 45.37 | 50.0 |
| 45.03 | 75.0 |
| 44.69 | 100.0 |
| 44.02 | 150.0 |
| 43.35 | 200.0 |
| 42.67 | 250.0 |
| 42.00 | 300.0 |
| 42.00 | 350.0 |
| 42.00 | 400.0 |
| 42.00 | 450.0 |

To determine the occurrence of the LVD disconnect threshold voltage, the actual load on the battery reserve during a discharge event needs to be measured. This allows the LVD controller 200 to calculate a disconnect voltage value that may be more suitable for the actual current being drawn. A power systems battery reserve may be planned to handle discharges that vary in their length of time from the typical 2 to 8 hours to those only lasting 10 to 15 seconds.

The LVD controller 200 will use the obtained current with the respective linear equation and boundary conditions to realize a value for the LVD threshold disconnect voltage. If for some reason the LVD controller 200 is unable to obtain the previous data, the LVD controller 200 can use the value of the $V_{LVDmin}$ as the LVD disconnect threshold voltage.

Figure 3:
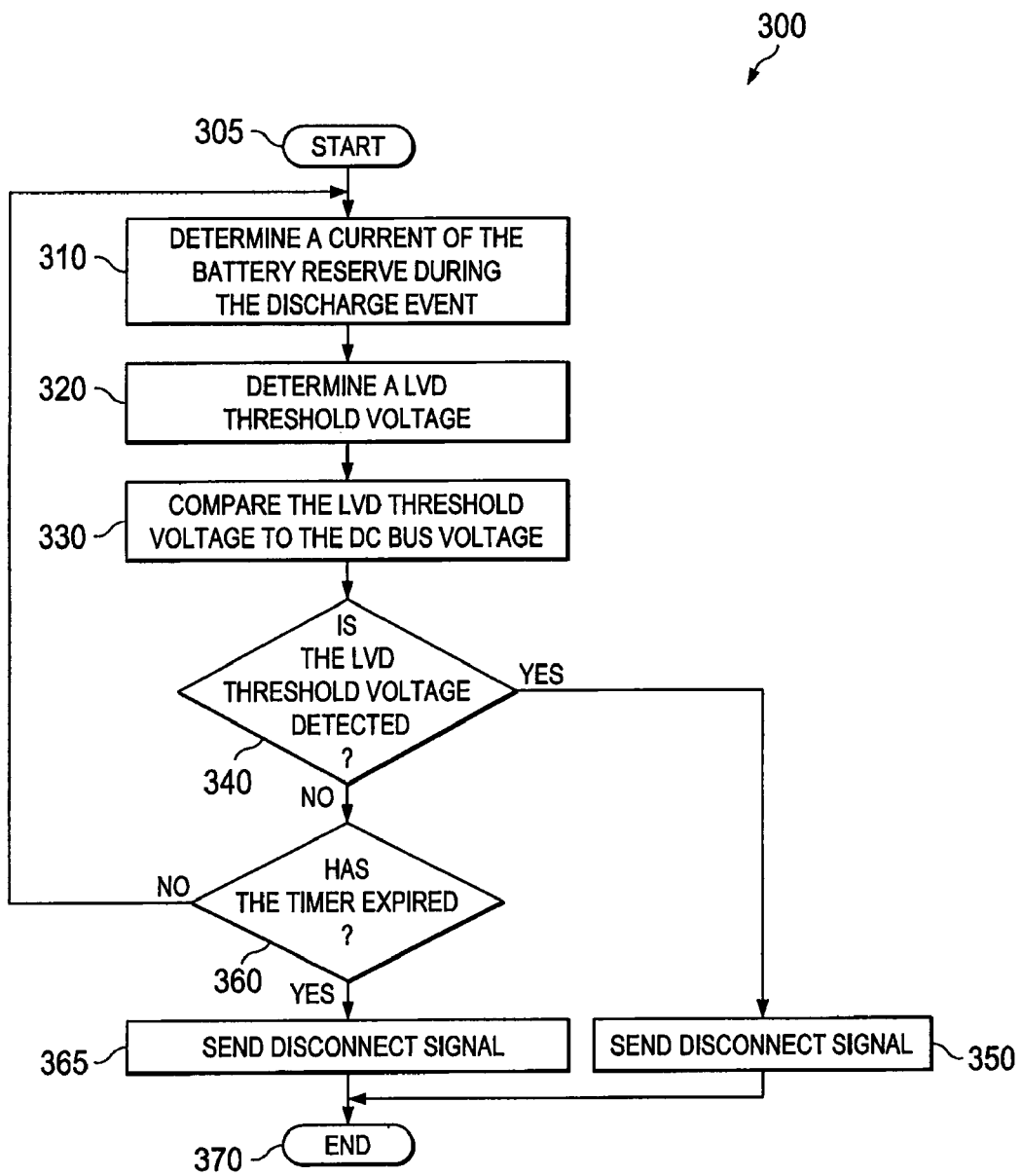
FIG. 3 illustrates a flow diagram of an embodiment of a method of protecting a battery reserve carried out according to the principles of the present invention.

FIG. 3 illustrates a flow diagram of an embodiment of a method 300 of protecting a battery reserve carried out according to the principles of the present invention. The battery reserve may be part of a power system configured to provide DC power to a load. The power system may include a disconnect switch or switches connecting the battery reserve to the DC bus. The method 300 begins in step 305 with intent to protect the battery reserve.

In a step 310, a current of the battery reserve during a battery discharge event is determined. The actual current may be measured. If the current cannot be measured, the current may be determined based on the load current just prior to the battery discharge event or the highest daily load current value for that day.

A LVD threshold voltage is then determined in a step 320. The LVD threshold voltage may be determined using a linear equation. The linear equation relates the LVD voltage to the load on the battery reserve during a battery discharge event.

The LVD threshold voltage is then compared to the voltage on the DC load bus in a step 330. A conventional voltmeter typically employed with battery reserves in power systems may be used to obtain the actual voltage on the DC bus during the discharge event. The actual voltage can then be compared to the LVD threshold voltage value.

Based on the comparison, a determination is then made in a first decisional step 340 if the DC bus voltage is the LVD threshold voltage. If the LVD threshold voltage is detected at the DC bus, then a disconnect signal is sent to disconnect the switch connecting the battery reserve to the DC load bus in a step 350. If the LVD threshold voltage is not detected, then a determination is made in a second decisional step 360 if the timer has expired. If so, then the disconnect signal is sent to the disconnect switch in a step 365. If the timer has not expired, then the method 300 continues to step 310.

Thus, the signal may be sent when the LVD threshold voltage is detected on the DC load bus based on the comparison between the two. If the LVD threshold voltage is not detected before the time delay expires, then the disconnect signal is sent when the time delay expires. After both step 350 and step 365, the method 300 continues to step 370 and ends.

Those skilled in the art to which the invention relates will appreciate that other and further additions, deletions, substitutions and modifications may be made to the described embodiments without departing from the scope of the invention.

What is claimed is:

1. A controller for a low voltage disconnect (LVD), comprising:
    an adaptive disconnect system configured to determine a variable LVD threshold voltage value and instruct said LVD to disconnect a battery reserve from a DC load bus based thereon, wherein said variable LVD threshold voltage is determined based on a current of said battery reserve during a battery-discharge event.

2. The controller as recited in claim 1 further comprising an elapsed-time disconnect system configured to instruct said LVD to disconnect said battery reserve from said DC load bus based on a designated amount of time.

3. The controller as recited in claim 1 wherein a maximum and a minimum LVD threshold voltage value are user-defined according to user-defined minimum and maximum current values for said battery reserve during a battery-discharge event.

4. The controller as recited in claim 3 wherein said adaptive disconnect system dynamically calculates said variable LVD threshold voltage value when said current is between said user-defined maximum and minimum current values.

5. The controller as recited in claim 3 wherein said adaptive disconnect system employs a fixed value for said variable LVD threshold voltage value when said current is greater than said maximum user-defined current value and less than said minimum user-defined current value.

6. The controller as recited in claim 5 wherein said variable LVD threshold voltage value is said maximum LVD threshold voltage when said current is less than said minimum user-defined current value.

7. The controller as recited in claim 5 wherein said variable LVD threshold voltage value is said minimum LVD threshold voltage when said current is greater than said maximum user-defined current value.

8. A method of protecting a battery reserve coupled to a DC load bus, comprising:
    initiating a timer for a time delay based on simultaneously detecting a failure associated with an AC supply employed to provide voltage to said DC load bus and a battery discharge event of said battery reserve;
    comparing a voltage on said DC load bus to a low voltage disconnect (LVD) threshold voltage; and
    sending a signal to disconnect a switch connecting said battery reserve to said DC load bus, wherein said signal is sent based on when said LVD threshold voltage is detected on said DC load bus or after said time delay.

9. The method as recited in claim 8 further comprising determining current of said battery reserve during said discharge event.

10. The method as recited in claim 8 wherein a maximum and a minimum LVD threshold voltage value are user-defined according to user-defined minimum and maximum current values for said battery reserve during a battery-discharge event.

11. The method as recited in claim 10 further comprising dynamically calculating said variable LVD threshold voltage value when said current is between said user-defined maximum and minimum current values.

12. The method as recited in claim 10 further comprising employing a fixed value for said variable LVD threshold voltage value when said current is greater than said maximum user-defined current value and less than said minimum user-defined current value.

13. The method as recited in claim 12 wherein said variable LVD threshold voltage value is said maximum LVD threshold voltage when said current is less than said minimum user-defined current value.

14. The method as recited in claim 12 wherein said variable LVD threshold voltage value is said minimum LVD threshold voltage when said current is greater than said maximum user-defined current value.

15. A power system manager, comprising:
    a user interface configured to accept input from a user; and
    a low voltage disconnect (LVD) controller coupled to said user interface, including:
        an elapsed-time disconnect system configured to disconnect a battery reserve from a DC load bus based on a designated amount of time; and
        an adaptive disconnect system configured to disconnect said battery reserve from said DC load bus based on a variable LVD threshold voltage, wherein said variable LVD threshold voltage is determined from a load on said battery reserve during a battery-on-discharge event.

16. The power system manager as recited in claim 15 wherein a maximum and a minimum LVD threshold voltage value are user-defined according to user-defined minimum and maximum current values for said battery reserve during a battery-discharge event.

17. The power system manager as recited in claim 16 wherein said adaptive disconnect system dynamically calculates said variable LVD threshold voltage value when said current is between said user-defined maximum and minimum current values.

18. The power system manager as recited in claim 17 wherein said adaptive disconnect system employs a fixed value for said variable LVD threshold voltage value when said current is greater than said maximum user-defined current value and less than said minimum user-defined current value.

19. The power system manager as recited in claim 18 wherein said variable LVD threshold voltage value is said maximum LVD threshold voltage when said current is less than said minimum user-defined current value.

20. The power system manager as recited in claim 18 wherein said variable LVD threshold voltage value is said minimum LVD threshold voltage when said current is greater than said maximum user-defined current value.

* * * * *

UNITED STATES PATENT AND TRADEMARK OFFICE
CERTIFICATE OF CORRECTION

| | | |
|---|---|---|
| PATENT NO. | : 8,148,948 B2 | Page 1 of 1 |
| APPLICATION NO. | : 12/404180 | |
| DATED | : April 3, 2012 | |
| INVENTOR(S) | : Davis et al. | |

It is certified that error appears in the above-identified patent and that said Letters Patent is hereby corrected as shown below:

In the Drawing

Fig. 1, Sheet 1 of 3, delete Tag "180" and insert -- 116 --, therefor.

In the Specification

Column 4, Line 66, delete "(3A-3B)" and insert -- (3A-3B), --, therefor.

Signed and Sealed this
Fifteenth Day of July, 2014

Michelle K. Lee
*Deputy Director of the United States Patent and Trademark Office*